United States Patent
Kang et al.

(10) Patent No.: US 12,543,963 B2
(45) Date of Patent: Feb. 10, 2026

(54) APPARATUS AND METHOD FOR ESTIMATING BIO-INFORMATION

(71) Applicant: SAMSUNG ELECTRONICS CO., LTD., Suwon-si (KR)

(72) Inventors: Jae Min Kang, Seoul (KR); Seung Woo Noh, Seongnam-si (KR); Sang Yun Park, Hwaseong-si (KR); Jin Woo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1156 days.

(21) Appl. No.: 17/500,620

(22) Filed: Oct. 13, 2021

(65) Prior Publication Data

US 2022/0409072 A1  Dec. 29, 2022

(30) Foreign Application Priority Data

Jun. 25, 2021  (KR) .................. 10-2021-0083382

(51) Int. Cl.
 *A61B 5/021* (2006.01)
 *A61B 5/00* (2006.01)
 *A61B 5/022* (2006.01)

(52) U.S. Cl.
 CPC ........ *A61B 5/02116* (2013.01); *A61B 5/0059* (2013.01); *A61B 5/02225* (2013.01); *A61B 5/742* (2013.01)

(58) Field of Classification Search
 CPC ............. A61B 5/02116; A61B 5/0059; A61B 5/02225; A61B 5/0053; A61B 5/70;
 (Continued)

(56) References Cited

U.S. PATENT DOCUMENTS 5,885,229 A * 3/1999 Yamato ............... A61B 5/1038
 600/592
10,398,324 B2  9/2019 Mukkamala et al.
 (Continued)

FOREIGN PATENT DOCUMENTS

CN  112294276 A  2/2021
JP  6802855 B2  12/2020
 (Continued)

OTHER PUBLICATIONS

Communication issued Mar. 10, 2023 by the Korean Intellectual Property Office in Korean Application No. 10-2021-0083382.
(Continued)

*Primary Examiner* — Jacqueline Cheng
*Assistant Examiner* — Jonathan E. Cooper
(74) *Attorney, Agent, or Firm* — Sughrue Mion, PLLC

(57) ABSTRACT

Provided is an apparatus configured to estimate bio-information, the apparatus including a pulse wave sensor including a plurality of channels disposed in an isotropic shape, a force sensor configured to measure a force applied by an object to the pulse wave sensor, and a processor configured to detect a center of gravity based on pressure, applied by the object, in a space formed by the plurality of channels based on pulse wave signals measured by each of the plurality of channels included in the pulse wave sensor, provide a user with guide information with respect to contact of the object to the pulse wave sensor based on the detected center of gravity, and estimate bio-information based on the pulse wave signals and the force which are measured based on the guide information.

12 Claims, 23 Drawing Sheets

(58) Field of Classification Search
CPC ...... A61B 2562/0247; A61B 2562/046; A61B 5/02007; A61B 5/0261; A61B 5/681; A61B 5/6843; A61B 5/6898; A61B 5/6826; A61B 5/02108; A61B 5/02416; A61B 5/024; A61B 5/021; A61B 5/7445; A61B 5/743; A61B 5/742; A61B 5/74; G06F 21/32
USPC .......................................................... 600/490
See application file for complete search history.

(56) References Cited

U.S. PATENT DOCUMENTS

| | | |
|---|---|---|
| 10,694,997 B2 | 6/2020 | Kim et al. |
| 10,878,216 B2 | 12/2020 | Kang et al. |
| 11,179,047 B2 | 11/2021 | Mukkamala et al. |
| 11,478,157 B2 | 10/2022 | Kwon et al. |
| 11,510,580 B2* | 11/2022 | Lee .................... A61B 5/02141 |
| 11,786,180 B2 | 10/2023 | Kang et al. |
| 2002/0053857 A1 | 5/2002 | Scott et al. |
| 2005/0105782 A1* | 5/2005 | Abiko ................ G06V 40/1335 382/124 |
| 2009/0289900 A1* | 11/2009 | Lavski ................ G06F 3/04845 345/173 |
| 2012/0075211 A1* | 3/2012 | Tsuzaki ............... G06F 3/04166 345/173 |
| 2016/0128625 A1 | 5/2016 | Lee et al. |
| 2016/0180141 A1 | 6/2016 | Sarve et al. |
| 2018/0235483 A1* | 8/2018 | Mouradian ............. G06F 1/163 |
| 2019/0239758 A1 | 8/2019 | Park et al. |
| 2019/0265072 A1 | 8/2019 | Wada et al. |
| 2020/0019745 A1 | 1/2020 | Kang et al. |
| 2020/0085315 A1 | 3/2020 | Kang et al. |
| 2020/0093377 A1 | 3/2020 | Kwon et al. |
| 2020/0364439 A1 | 11/2020 | Hu |
| 2020/0383641 A1 | 12/2020 | Hwang et al. |
| 2021/0022622 A1* | 1/2021 | Lee .................... A61B 5/02427 |
| 2021/0038098 A1 | 2/2021 | Hwang et al. |
| 2021/0165991 A1 | 6/2021 | Kang et al. |
| 2021/0267550 A1* | 9/2021 | Mukkamala ............ G06F 3/044 |
| 2021/0298618 A1 | 9/2021 | Mukkamala et al. |
| 2024/0041336 A1* | 2/2024 | Wassertheurer ..... A61B 5/6843 |

FOREIGN PATENT DOCUMENTS

| | | |
|---|---|---|
| KR | 10-0660349 B1 | 12/2006 |
| KR | 10-2013-0057907 A | 6/2013 |
| KR | 10-2016-0090125 A | 7/2016 |
| KR | 10-2019-0094730 A | 8/2019 |
| KR | 10-2020-0005445 A | 1/2020 |
| KR | 10-2020-0007312 A | 1/2020 |
| KR | 10-2020-0025553 A | 3/2020 |
| KR | 10-2020-0034422 A | 3/2020 |
| WO | 2017152098 A1 | 9/2017 |

OTHER PUBLICATIONS

Communication issued Nov. 20, 2024 by the China National Intellectual Property Administration in Chinese Patent Application No. 202111312401.7.

Communication dated May 24, 2022 issued by the European Patent Office in European Application No. 21213399.5.

* cited by examiner

APPARATUS AND METHOD FOR ESTIMATING BIO-INFORMATION

CROSS-REFERENCE TO RELATED APPLICATION

This application claims priority from Korean Patent Application No. 10-2021-0083382, filed on Jun. 25, 2021, in the Korean Intellectual Property Office, the entirety of which is incorporated herein by reference.

BACKGROUND

1. Field

Example embodiments of the present disclosure relate to an apparatus and method for non-invasively estimating bio-information.

2. Description of Related Art

Generally, methods of non-invasively measuring blood pressure without damaging a human body include a method to measure blood pressure by measuring a cuff-based pressure and a method to estimate blood pressure by measuring pulse waves without the use of a cuff.

A Korotkoff-sound method is one of cuff-based blood pressure measurement methods, in which a pressure in a cuff wound around an upper arm is increased and blood pressure is measured by listening to the sound generated in the blood vessel through a stethoscope while decreasing the pressure. Another cuff-based blood pressure measurement method is an oscillometric method using an automated machine, in which a cuff is wound around an upper arm, a pressure in the cuff is increased, a pressure in the cuff is continuously measured while the cuff pressure is gradually decreased, and blood pressure is measured based on a point where a change in a pressure signal is large.

Cuffless blood pressure measurement methods generally include a method of estimating blood pressure by calculating a pulse transit time (PTT), and a pulse wave analysis (PWA) method of estimating blood pressure by analyzing a pulse wave shape.

SUMMARY

One or more example embodiments provide an apparatus and method for non-invasively estimating bio-information.

According to an aspect of an example embodiment, there is provided an apparatus configured to estimate bio-information, the apparatus including a pulse wave sensor including a plurality of channels disposed in an isotropic shape, a force sensor configured to measure a force applied by an object to the pulse wave sensor, and a processor configured to detect a center of gravity based on pressure, applied by the object, in a space formed by the plurality of channels based on pulse wave signals measured by each of the plurality of channels included in the pulse wave sensor, provide a user with guide information with respect to contact of the object to the pulse wave sensor based on the detected center of gravity, and estimate bio-information based on the pulse wave signals and the force which are measured based on the guide information.

Each of the plurality of channels included in the pulse wave sensor may include at least one of a light source configured to emit light onto the object, and a detector configured to detect light scattered or reflected from the object.

The processor may be further configured to extract direct current (DC) values from the pulse wave signals measured by each of the plurality of channels, generate an intensity map by mapping the extracted DC values of each of the plurality of channels to a circular boundary, and detect the center of gravity based on the generated intensity map.

Based on the DC values of each of the plurality of channels, the processor may be further configured to obtain DC values for a plurality of virtual channels to be disposed on the circular boundary, and generate the intensity map by mapping the DC values of each of the plurality of channels and the DC values of the plurality of virtual channels to the circular boundary.

The apparatus may further include an output interface configured to display a graphic object having a predetermined shape on a screen to guide a user to place the object on the space.

Based on the detected center of gravity, the output interface may be further configured to highlight a position of the force, applied by the object, on the graphic object, and move the highlighted position based on a change in the center of gravity.

The output interface may be configured to display a trajectory of the center of gravity during an entire measurement time by superimposing the trajectory of the center of gravity on the graphic object.

The output interface may be further configured to display a graph showing a change in separation distance between a center of the space and the center of gravity.

The processor may be further configured to calculate a score with respect to the trajectory of the center of gravity based on the separation distance, and the output interface may be further configured to display the calculated score on the screen.

The output interface may be further configured to display at least one of a graphic object configured to guide a change in reference force to be applied by the object to the pulse wave sensor during measurement of the pulse wave signals, and a graphic object representing a change in actual force measured by the force sensor.

The processor may be further configured to determine whether to re-measure the pulse wave signals based on the separation distance between the center of gravity at each time point and the center of the space.

Based on at least one of a number of times the separation distance deviates from a reference value being greater than or equal to a threshold number of times, a period of time when the separation distance continuously deviates from the reference value being greater than or equal to a threshold period of time, and a score for the trajectory of the center of gravity being lower than or equal to a threshold value, the processor may be further configured to determine whether to re-measure the pulse wave signals.

The processor may be further configured to generate an oscillometric waveform envelope based on the pulse wave signals and the force, and estimate the bio-information based on the generated oscillometric waveform envelope.

The bio-information may include one or more of blood pressure, vascular age, arterial stiffness, aortic pressure waveform, vascular compliance, stress index, and fatigue level.

According to another aspect of an example embodiment, there is provided a method of estimating bio-information, the method including measuring, by a pulse wave sensor including a plurality of channels disposed in an isotropic shape, pulse wave signals from an object, measuring, by a force sensor, a force applied by the object to the pulse wave sensor, detecting a center of gravity according to pressure, applied by the object, in a space formed by the plurality of channels based on the pulse wave signals measured by each of the plurality of channels included the pulse wave sensor, providing a user with guide information with respect to contact of the object to the pulse wave sensor during measurement of the pulse wave signals based on the detected center of gravity, and estimating bio-information based on the pulse wave signals and the force which are measured based on the guide information.

The detecting of the center of gravity may further include extracting direct current (DC) values from the pulse wave signals measured by each of the plurality of channels, generating an intensity map by mapping the extracted DC values of each of the plurality of channels to a circular boundary, and detecting the center of gravity based on the generated intensity map.

The generating of the intensity map may include obtaining DC values for a plurality of virtual channels to be disposed on the circular boundary based on the DC values of the respective channels, and generating the intensity map by mapping the DC values of each of the plurality of channels and the DC values of the plurality of virtual channels to the circular boundary.

The method may further include determining whether to re-measure the pulse wave signals based on a separation distance between the center of gravity at each time point and a center of the space.

The estimating of the bio-information may further include generating an oscillometric waveform envelope based on the pulse wave signals and the force, and estimating the bio-information based on the generated oscillometric waveform envelope.

According to another aspect of an example embodiment, there is provided an electronic device including a main body, a pulse wave sensor including a plurality of channels disposed in an isotropic shape on a surface of the main body which comes into contact with an object, a force sensor disposed on an upper end or a lower end of the pulse wave sensor and configured to measure a force applied by the object to the pulse wave sensor, and a processor configured to detect a center of gravity based on pressure, applied by the object, in a space formed by the plurality of channels based on pulse wave signals measured by each of the plurality of channels included in the pulse wave sensor, provide a user with guide information with respect to contact of the object to the pulse wave sensor based on the detected center of gravity, and estimate blood pressure based on the pulse wave signals and the force which are measured based on the guide information.

According to another aspect of an example embodiment, there is provided an apparatus configured to estimate bio-information, the apparatus including a pulse wave sensor including a plurality of channels disposed in an isotropic shape, a force sensor configured to measure a force applied by an object to the pulse wave sensor, and a processor configured to detect a center of gravity based on pressure, applied by the object, in a space formed by the plurality of channels based on direct current (DC) values extracted from pulse wave signals measured by each of the plurality of channels included in the pulse wave sensor, provide a user with guide information with respect to contact of the object to the pulse wave sensor based on the detected center of gravity being spaced apart from a center of the space, and estimate bio-information based on the pulse wave signals and the force which are measured based on the guide information.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
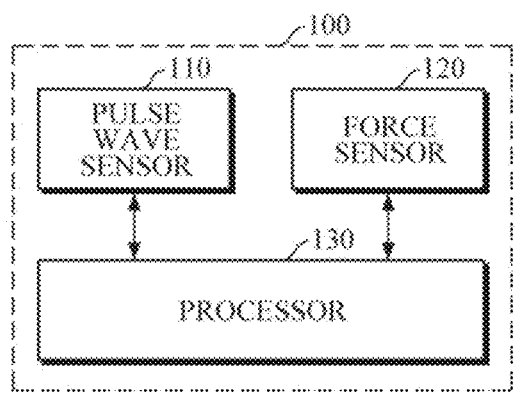
FIG. 1 is a block diagram illustrating an apparatus configured to estimate bio-information according to an example embodiment.

Details of example embodiments are included in the following detailed description and drawings. Advantages and features of the present disclosure, and a method of achieving the same will be more clearly understood from the following example embodiments described in detail with reference to the accompanying drawings. Throughout the drawings and the detailed description, unless otherwise described, the same drawing reference numerals will be understood to refer to the same elements, features, and structures.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. It will be further understood that when an element is referred to as "comprising" another element, the element is intended not to exclude one or more other elements, but to further include one or more other elements, unless explicitly described to the contrary. In the following description, terms such as "unit" and "module" indicate a unit for processing at least one function or operation and they may be implemented by using hardware, software, or a combination thereof Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a block diagram illustrating an apparatus configured to estimate bio-information according to an example embodiment.

Referring to FIG. 1, the apparatus 100 configured to estimate bio-information includes a pulse wave sensor 110, a force sensor 120, and a processor 130.

The pulse wave sensor 110 may measure a pulse wave signal, including a photoplethysmography (PPG) signal, from an object. The pulse wave sensor 110 may be composed of a plurality of channels formed in an isotropic shape. Each channel may include a light source configured to emit light onto an object, and a detector configured to detect light returning after being scattered or reflected from or transmitted into a skin surface or blood vessels of the object after the light is emitted by the light source. The pulse wave sensor 110 may include a plurality of light sources and detectors, and the plurality of light sources may emit light of a green wavelength, a blue wavelength, a red wavelength, an infrared wavelength, and the like. The light source may include a light emitting diode (LED), a laser diode (LD), a phosphor, etc., but is not limited thereto. Further, the detector may include a photo diode, a photo transistor (PTr), an image sensor (for example, a complementary metal-oxide semiconductor (CMOS) image sensor), etc., but is not limited thereto.

The force sensor 120 may measure a force exerted on the pulse wave sensor 110 when a user places the object on the pulse wave sensor 110 and gradually increases a pressing force, or when the user applies a force greater than or equal to a threshold and then gradually decreases the force. The force sensor 120 may be disposed on an upper end or a lower end of the pulse wave sensor 110. The force sensor 120 may include a strain gauge and the like, or may be formed as a single force sensor or as an array of force sensors. In this case, the force sensor 120 may be modified to a pressure sensor in combination with the force sensor 120 and an area sensor, or an air bladder type pressure sensor, and the like.

The processor 130 may be electrically connected to the pulse wave sensor 110 and/or the force sensor 120, and may control the pulse wave sensor 110 and the force sensor 120 in response to a request configured to estimate bio-information.

Upon receiving a request configured to estimate bio-information from a user, the processor 130 may guide a contact position so that the user may correctly place an object on a space formed by the plurality of channels formed in an isotropic shape, and may guide a reference force so that a proper force may be applied during measurement of pulse wave signals.

Further, while measurement of pulse wave signals is performed, the processor 130 may guide a change in contact position of the object, a change in contact force, and/or a pressing position or direction of the object, and the like, so that the user may apply a uniform force to the respective channels while the user places the object on a correct position. In addition, upon measurement of pulse wave signals is complete, the processor 130 may determine whether to re-measure the pulse wave signals, and if re-measurement is required, the processor 130 may guide a user to re-measure the pulse wave signals. For example, by using a direct current (DC) component of the pulse wave signal of each channel, the processor 130 may detect the center of gravity according to pressure applied by the object, and based on the detected center of gravity, the processor 130 may guide a contact position, a pressing position, and/or a pressing direction, etc., of the object. Further, the processor 130 may determine whether to re-measure pulse wave signals.

The processor 130 may estimate bio-information based on a last measured pulse wave signal and force. In this case, the bio-information may include, for example, heart rate, blood pressure, vascular age, arterial stiffness, aortic pressure waveform, vascular compliance, stress index, fatigue level, skin elasticity, skin age, etc., but is not limited thereto. For convenience of explanation, the following description will be made using blood pressure as an example.

Figure 2:
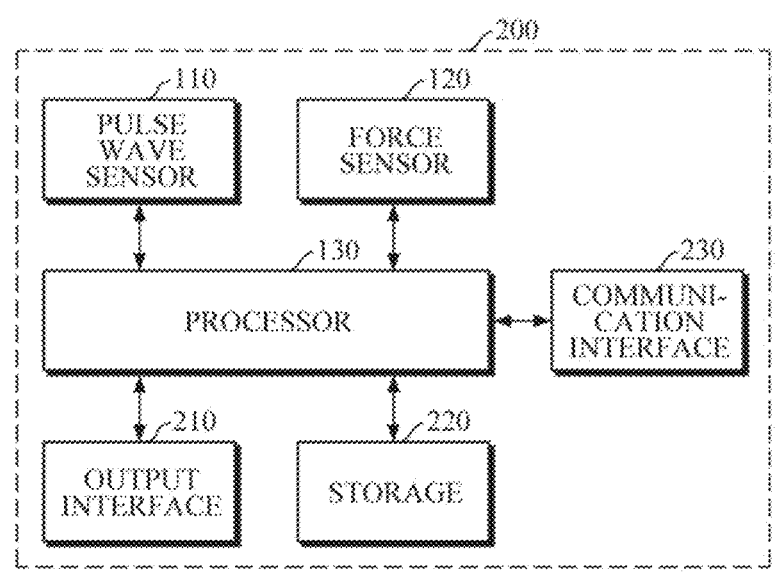
FIG. 2 is a block diagram illustrating an apparatus configured to estimate bio-information according to another example embodiment.

Referring to FIG. 2, an apparatus 200 configured to estimate bio-information according to another example embodiment may further include an output interface 210, a storage 220, and a communication interface 230, in addition to the pulse wave sensor 110, the force sensor 120, and the processor 130. The pulse wave sensor 110, the force sensor 120, and the processor 130 are described above with reference to FIG. 1, such that a description thereof will be omitted below.

The output interface 210 may output the pulse wave signal acquired by the pulse wave sensor 110 and the contact force acquired by the force sensor 120 under the control of the processor 130, and/or various processing results of the processor 130.

For example, the output interface 210 may visually output guide information with respect to the contact of the object, which is generated by the processor 130, through, for example, a display module, or may non-visually output the information by voice, vibrations, tactile sensation, and the like using a speaker module, a haptic module, or the like. According to an example embodiment, a display area may be divided into two or more areas, in which the output interface 210 may output guide information with respect to the contact force of the object in a first area, and may output guide information on the contact position with respect to the object, the center of gravity according to pressure of the object, and the like in a second area.

Further, the output interface 210 may visually output an estimated bio-information value, generated by the processor 130, through a display module, or may non-visually output the value by voice, vibrations, tactile sensation, and the like using a speaker module, a haptic module, or the like. The display area may be divided into two or more areas, in which the output interface 210 may output detailed information, such as the pulse wave signal, contact force, etc. used configured to estimate bio-information, in the form of various graphs in the first area. Along with the information, the output interface 210 may output an estimated bio-information value in the second area. In this case, when the estimated bio-information value falls outside a normal range, the output interface 210 may output warning information in various manners, such as highlighting an abnormal value in red and the like, displaying the abnormal value along with a normal range, outputting a voice warning message, adjusting a vibration intensity, and the like.

The storage 220 may store the pulse wave signal acquired by the pulse wave sensor 110 and the contact force acquired by the force sensor 120 under the control of the processor 130, and/or various processing results of the processor 130. Further, the storage 220 may store a variety of reference information required configured to estimate bio-information. For example, the reference information may include user characteristic information such as a user's age, gender, health condition, etc., a bio-information estimation model, and the like, but is not limited thereto.

In this case, the storage 220 may include at least one storage medium of a flash memory type memory, a hard disk type memory, a multimedia card micro type memory, a card type memory (for example, an SD memory, an XD memory, etc.), a random access memory (RAM), a static random access memory (SRAM), a read only memory (ROM), an electrically erasable programmable read only memory (EEPROM), a programmable read only memory (PROM), a magnetic memory, a magnetic disk, and an optical disk, and the like, but is not limited thereto.

The communication interface 230 may communicate with an external device by using wired or wireless communication techniques under the control of the processor 130, and may transmit and receive various data to and from the external device. For example, while measurement of pulse wave signals is performed, the communication interface 230 may transmit guide information on the contact of the object, which is generated by the processor 130, to the external device, so that the guide information may be displayed on a display of the external device.

Further, the communication interface 230 may transmit a bio-information estimation result to the external device, and may receive, from the external device, a variety of reference information required configured to estimate bio-information. In this case, the external device may include a cuff-type blood pressure measuring device and an information processing device such as a smartphone, a tablet personal computer (PC), a desktop computer, a laptop computer, and the like.

In this case, examples of the communication techniques may include Bluetooth communication, Bluetooth low energy (BLE) communication, near field communication (NFC), WLAN communication, Zigbee communication, infrared data association (IrDA) communication, Wi-Fi Direct (WFD) communication, ultra-wideband (UWB) communication, Ant+ communication, WIFI communication, radio frequency identification (RFID) communication, 3G communication, 4G communication, 5G communication, and the like. However, embodiments are not limited thereto.

When both of the output interface 210 and the communication interface 230 are provided, the processor 130 may selectively control the output interface 210 and the communication interface 230, so that required information may be output to any one of an electronic device (for example, smart watch), including the apparatus 200 configured to estimate bio-information, and an external device (for example, smartphone). In this case, the processor 130 may determine a device to output information in response to a user's request or by using various sensors mounted in the electronic device including the apparatus 200 configured to estimate bio-information. For example, by using an acceleration sensor and/or a camera module, etc., mounted in the electronic device, the processor 130 may automatically detect a direction of a display mounted in the electronic device, and when the detected direction of the display is a direction (for example, downward direction) which is not within reach of a user's gaze, the processor 130 may control the communication interface 230 to output information required for the external device. According to another example embodiment, the processor 130 may control both the output interface 210 and the communication interface 230 so that information may be output in a mutually complementary manner.

Various examples of guiding contact of an object will be described below with reference to FIGS. 3A to 5E.

FIGS. 3A to 3E illustrate an arrangement structure of a pulse wave sensor and a change in the center of gravity according to pressure applied by an object.

Figure 3A:
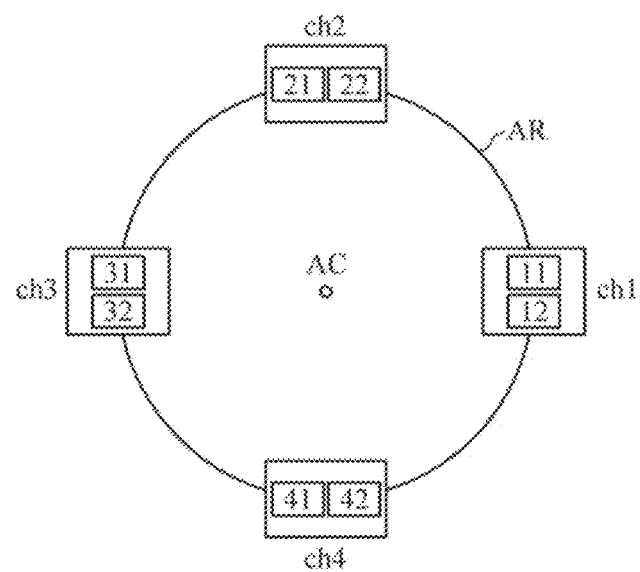
FIGS. 3A, 3B, 3C, 3D, and 3E illustrate an arrangement structure of a pulse wave sensor and a change in the center of gravity according to pressure applied by an object.

FIG. 3A illustrates an arrangement structure of a pulse wave sensor according to an example embodiment. Referring to FIG. 3A, the pulse wave sensor 110 includes a plurality of channels ch1, ch2, ch3, and ch4 which are formed in an isotropic shape from a center AC of the pulse wave sensor, and as the plurality of channels ch1, ch2, ch3, and ch4 are formed in an isotropic shape, a virtual space AR is formed in a predetermined shape (for example, circular shape). In FIG. 3A, four channels are illustrated as an example, but the number of channels is not limited thereto. As illustrated in FIG. 3A, the channels ch1, ch2, ch3, and ch4 may include light sources 11, 21, 31, and 41, and detectors 12, 22, 32, and 42, respectively. The number of light sources and detectors included in the respective channels ch1, ch2, ch3, and ch4 is not necessarily limited to one, and may be formed as a plurality of arrays. In this case, the plurality of light sources may emit light of different wavelengths, for example, green, blue, red, and infrared wavelengths, and the like.

Figure 3B:
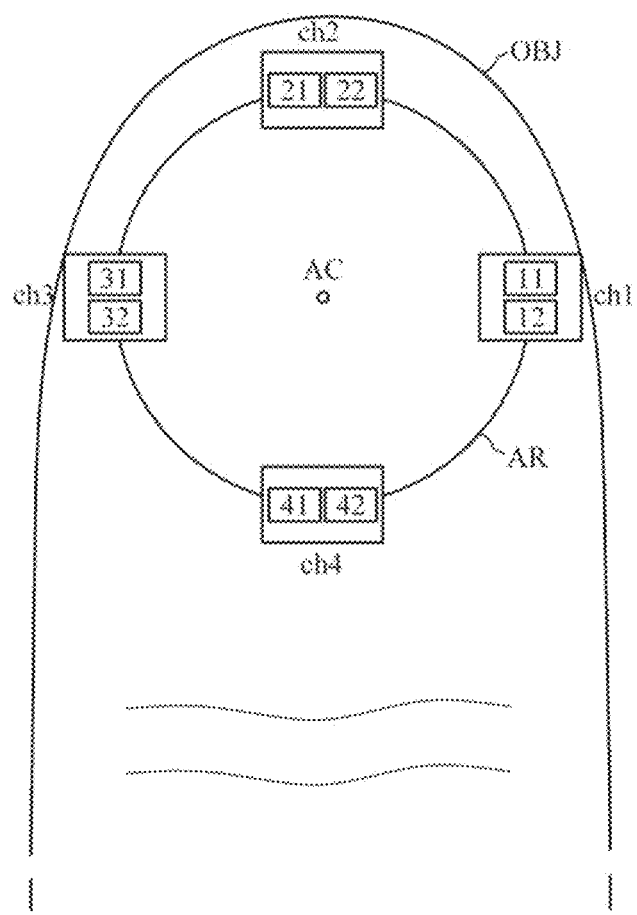

Referring to FIG. 3B, in a structure of a pulse wave sensor formed in an isotropic shape as illustrated in FIG. 3A, an object OBJ is placed on a virtual space AR, and when a pressing force thereof gradually increases or decreases, the respective channels ch1, ch2, ch3, and ch4 of the pulse wave sensor 110 may measure pulse wave signals from the object. The processor 130 may sequentially drive the plurality of channels ch1, ch2, ch3, and ch4 in a predetermined pattern, for example, clockwise direction, counterclockwise direction, diagonal direction, etc., or may simultaneously drive two or more thereof. In this case, when driving, for example, the light source 11 of channel 1 ch1, the processor 130 may simultaneously drive the detector 32 of channel 3 ch3 which is located on a diagonal of the light source 11, thereby allowing the detector 32 of channel 3 ch3 to detect light reacting by being scattered or reflected from or transmitted into the object after the light is emitted by the light source 11 of channel 1 ch1.

Figure 3C:
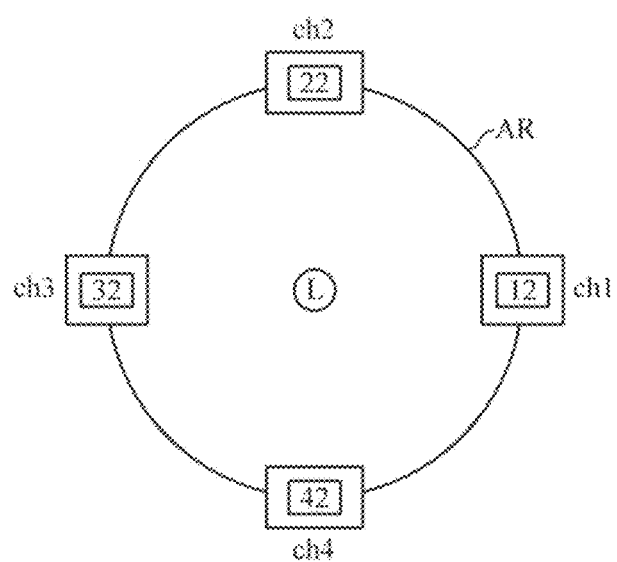

FIG. 3C illustrates an arrangement structure of a pulse wave sensor according to another example embodiment. Referring to FIG. 3C, one or more light sources L are disposed at the center of the pulse wave sensor 110, and the channels ch1, ch2, ch3, and ch4 are formed in an isotropic shape from the center thereof. The respective channels ch1, ch2, ch3, and ch4 may include one or more detectors 12, 22, 32, and 42, which may detect light emitted from the light sources L at the center and reacting with the object when the object is placed on the virtual space AR as illustrated in FIG. 3B. In this case, the light sources L at the center are turned on in a time-division manner, and the channels ch1, ch2, ch3, and ch4 formed in an isotropic shape are driven in a time-division manner or at the same time to detect the light.

Figure 3D:
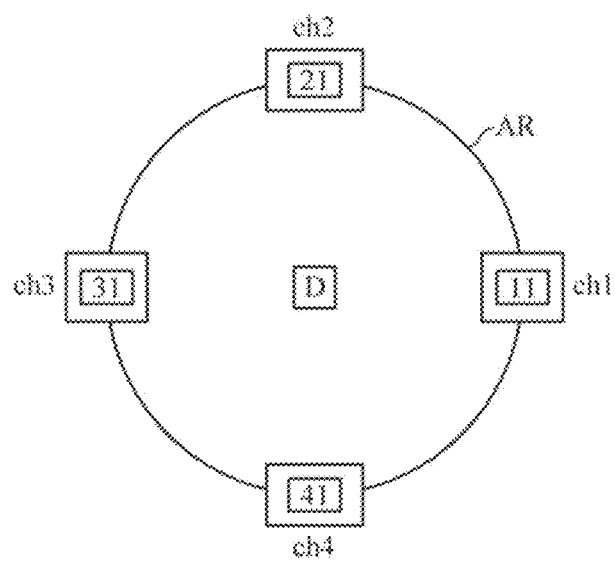

FIG. 3D illustrates an arrangement structure of a pulse wave sensor according to yet another example embodiment. Referring to FIG. 3D, one or more detectors D are disposed at the center of the pulse wave sensor 110, and the channels ch1, ch2, ch3, and ch4 are formed in an isotropic shape from the center thereof. The respective channels ch1, ch2, ch3, and ch4 may include one or more light sources 11, 21, 31, and 41, and when the object is placed on the virtual space AR as illustrated in FIG. 3B, the light sources 11, 21, 31, and 41 of the respective channels ch1, ch2, ch3, and ch4 may be turned on in a predetermined order, for example, in a clockwise direction, counterclockwise direction, diagonal direction, etc., in a time-division manner and the detector D disposed at the center may detect light reacting with the object.

Figure 3E:
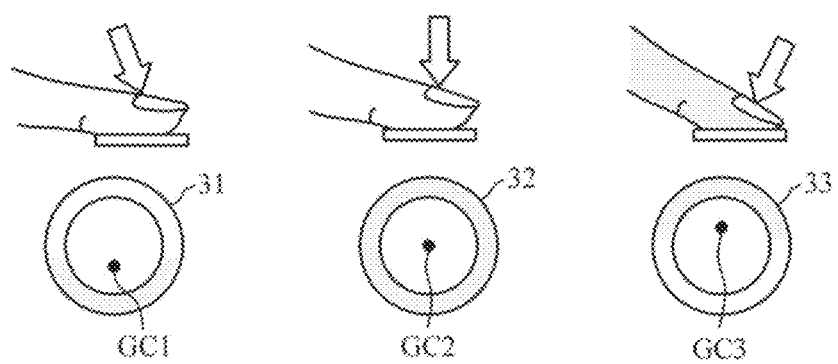

FIG. 3E illustrates a change in the center of gravity and an intensity map according to a direction or position of pressure applied by a finger when the finger is placed on the virtual space AR such that a feature point (for example, fingerprint center) is positioned at the center AC of the virtual space AR. In FIG. 3E, the middle figure illustrates an example in which a position of the feature point of the finger is pressed vertically onto the center AC of the virtual space AR, such that a uniform force may applied to the respective channels, in which case the center of gravity GC2 according to the pressure is located at the center of an intensity map 32, and right and left side figures illustrate examples in which a position of the feature point of the finger is not pressed vertically onto the center AC of the virtual space AR, but a force is applied to a lower position and an upper position. As illustrated herein, the centers of gravity GC1 and GC3 are located at a lower side and an upper side of intensity maps 31 and 33, respectively. Accordingly, when the object does not vertically and uniformly apply a force onto the center of the pulse wave sensor 110, and a direction or position of the force is changed, noise may be included in the measured pulse wave signal, thereby reducing accuracy in estimating bio-information.

FIGS. 4A to 4E illustrate an example of detecting a change in the center of gravity according to pressure applied by an object according to an example embodiment.

Figure 4A:
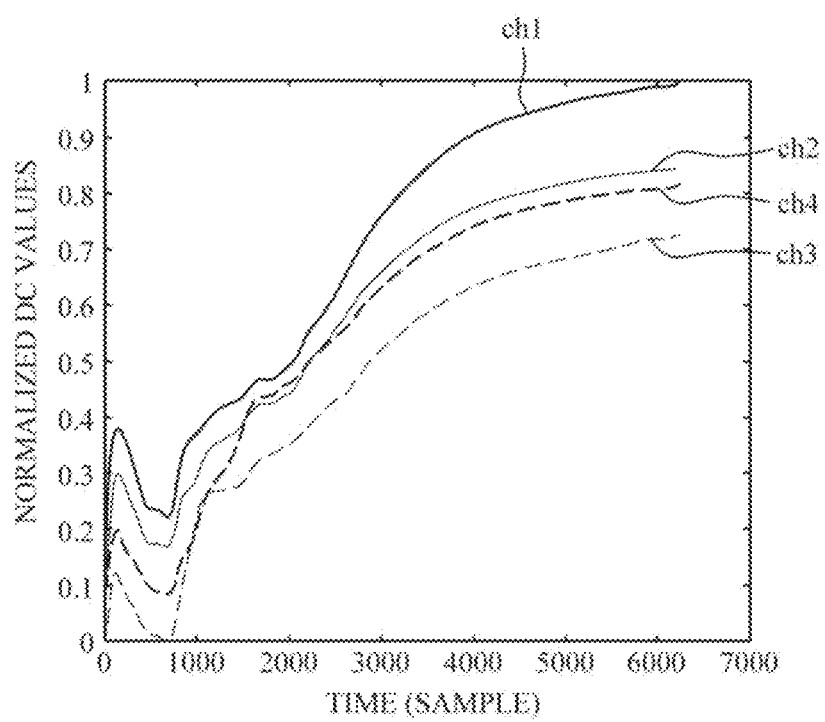
FIGS. 4A, 4B, 4C, 4D, and 4E illustrate an example of detecting a change in the center of gravity according to pressure applied by an object according to an example embodiment.
Figure 4B:
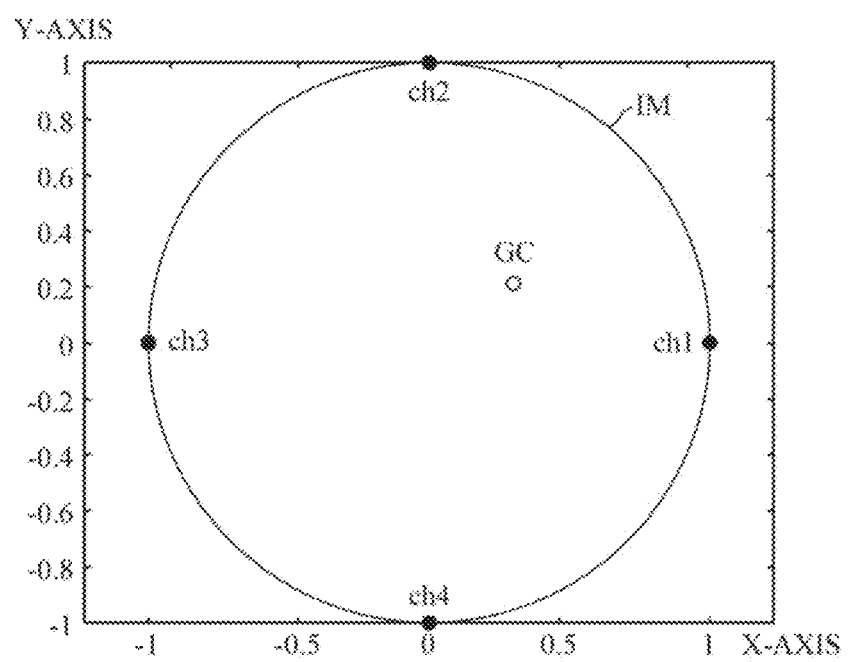

By using each pulse wave signal measured by the plurality of channels of the pulse wave sensor 110, the processor 130 may detect the center of gravity at each time point according to pressure applied by an object. For example, FIG. 4A illustrates DC component signals of the pulse wave signals measured by the four channels ch1, ch2, ch3, and ch4 illustrated in FIG. 3A, in which when the respective channels measure the pulse wave signals, the processor 130 may extract and normalize DC components by filtering the pulse wave signals.

The processor 130 may generate an intensity map IM for each time point by mapping the DC values of each time point of the respective channels ch1, ch2, ch3, and ch4 to, for example, corresponding positions on a circular boundary having a center at (0,0) and a radius of 1. The processor 130 may detect the center of gravity GC of each time point based on the generated intensity map IM of each time point.

Figure 4C:
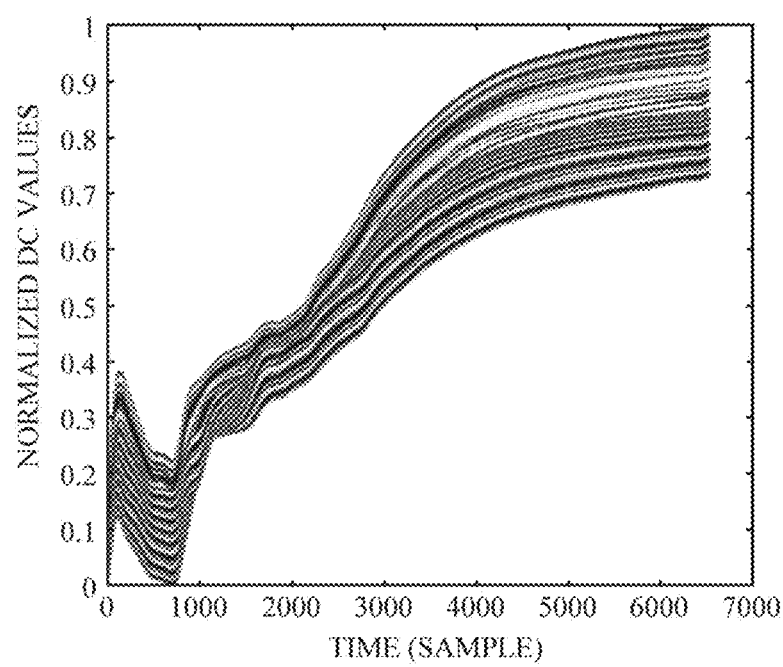

In this case, the processor 130 may further provide a plurality of virtual channels on the circular boundary, and may obtain DC values for the plurality of virtual channels by performing circular interpolation on the obtained DC values of the actual channels ch1, ch2, ch3, and ch4. FIG. 4C illustrates DC component signals of all channels (for example, 120 channels) including the obtained DC components of the plurality of virtual channels. By mapping the obtained DC values of each time point of all the channels to corresponding positions on the circular boundary, the processor 130 may generate the intensity map IM for each time point, and may detect the center of gravity of each time point based on the intensity map IM.

Figure 4D:
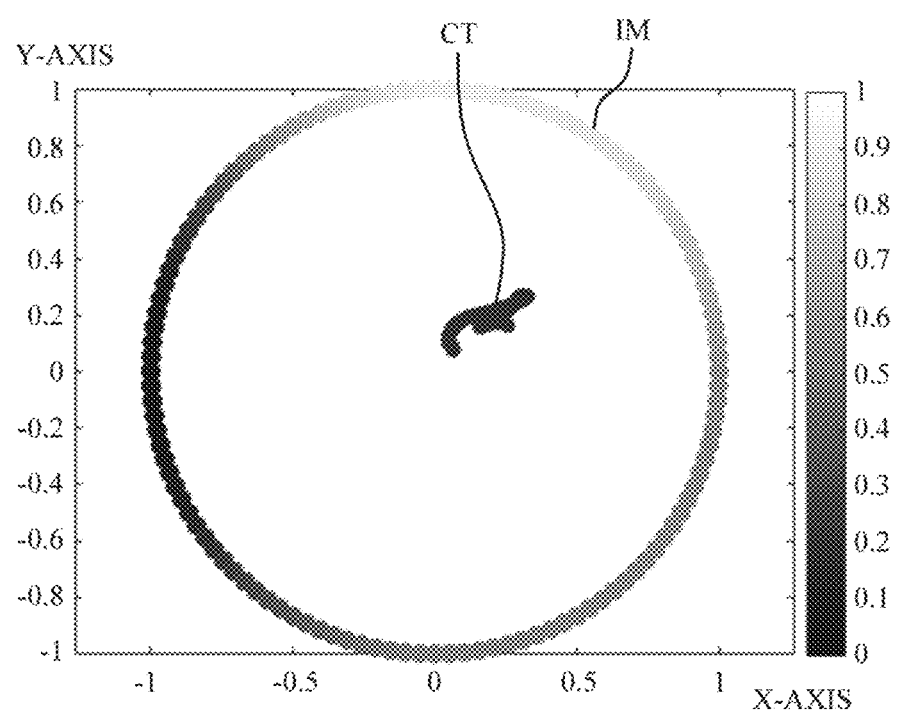
Figure 4E:
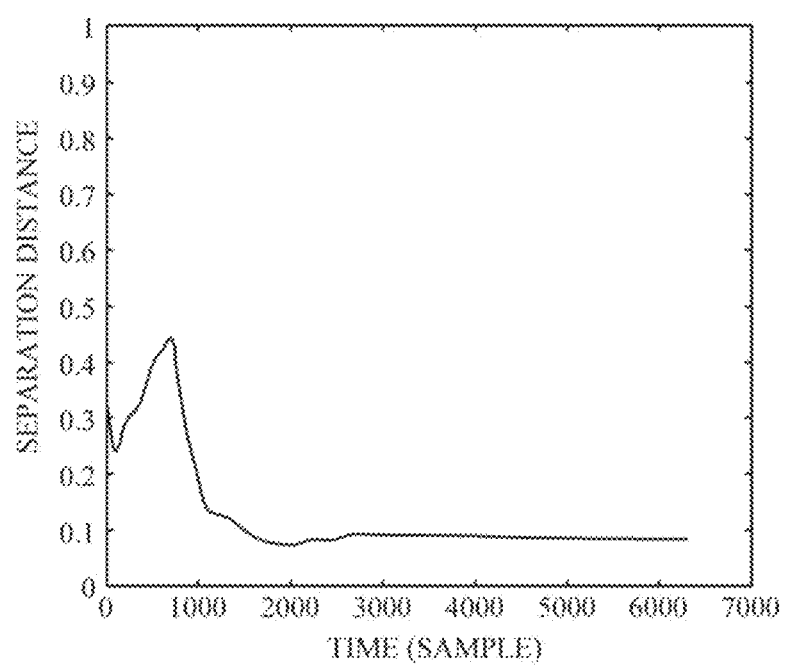

FIG. 4D illustrates a trajectory CT of the center of gravity during the entire measurement time. FIG. 4E illustrates a change in separation distance between the center of a space, formed by the plurality of channels, and the center of gravity. When measurement of pulse wave signals is complete, the processor 130 may generate the trajectory of the center of gravity and/or data on the change in separation distance as illustrated herein, by using the center of gravity of each time point, which is detected based on the intensity map for each time point.

In addition, the processor 130 may calculate a score for the trajectory of the center of gravity based on the center of gravity of each time point and/or the data on the change in separation distance. For example, the processor 130 may calculate a score for the trajectory of the center of gravity based on a number of times the separation distance deviates from a reference value during the entire measurement time, and/or a period of time when the separation distance continuously deviates from the reference value, and the like. In another example, the processor 130 may convert an average area of areas under curve for each time in a separation distance graph, illustrated in FIG. 4E, into the score for the trajectory of the center of gravity.

Further, the processor 130 may determine whether to re-measure pulse wave signals based on the separation distance and/or the score for the trajectory of the center of gravity, and the like. For example, if predetermined conditions are satisfied, including a case where a number of times the separation distance deviates from a reference value during the entire measurement time is greater than or equal to a threshold number of times, or a case where the score for the trajectory of the center of gravity is lower than or equal to a threshold value, or the like, the processor 130 may determine to re-measure the pulse wave signals.

FIGS. 5A to 5E illustrate examples of guiding contact of an object according to example embodiments.

The output interface 210 and/or the communication interface 230 may be connected to the processor 130 to display information for guiding contact of an object on a display screen 50 of an electronic device, in which the apparatus 200 configured to estimate bio-information is mounted, and/or an external device. For convenience of explanation, the following description will be made based on an example in which the output interface 210 outputs the information on the display screen 50 of an electronic device in which the apparatus 200 configured to estimate bio-information is mounted.

Figure 5A:
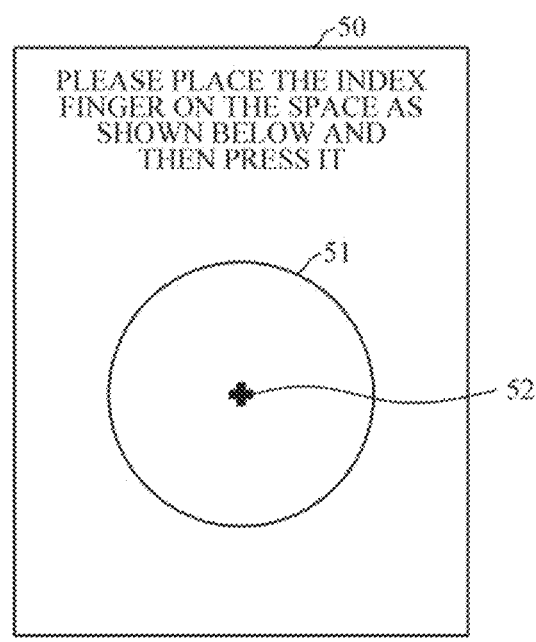
FIGS. 5A, 5B, 5C, 5D, and 5E illustrate examples of guiding contact of an object according to an example embodiment.

Referring to FIG. 5A, upon receiving a request configured to estimate bio-information, the output interface 210 may display, for example, a circular graphic object 51, representing a space formed by the plurality of channels, so that a user may correctly place the object on the pulse wave sensor 110. In this case, the output interface 210 may output a text, such as "please place the index finger on the space as shown below and then press it," at the upper end of the display screen 50. Further, the output interface 210 may display a marker 52 having a predetermined shape (for example, crisscross, circle, etc.), which is superimposed on the center of the graphic object 51, for inducing a feature point of the finger to be located on the center of the circle and to press vertically onto the center.

Figure 5B:
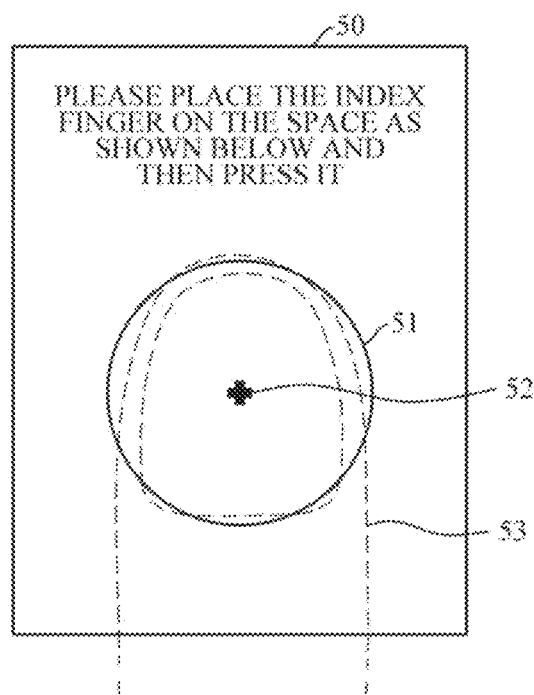

Referring to FIG. 5B, when a user's finger is placed on the pulse wave sensor 110, the processor 130 may detect a contact position and/or direction of the finger, and based on information on the detected contact position and/or direction, the output interface 210 may display a graphic object 53 having a finger shape, which is superimposed on a corresponding position of the graphic object 51.

Figure 5C:
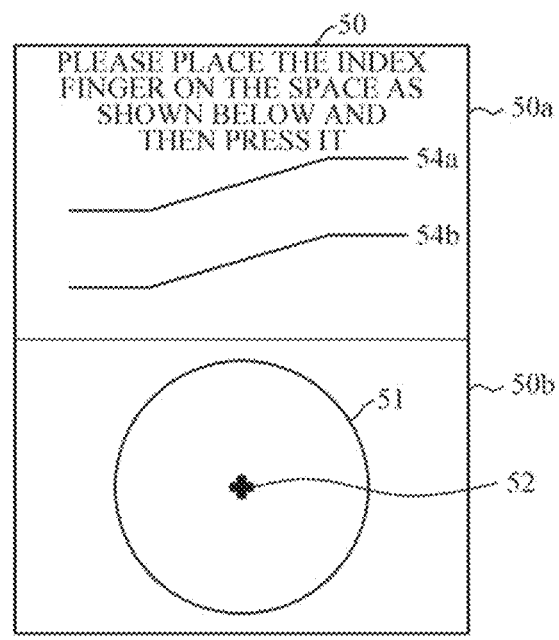

Referring to FIG. 5C, upon receiving a request configured to estimate bio-information, the output interface 210 may divide the display screen 50 into two areas 50a and 50b, and may display, for example, the circular graphic object 51 in a lower area 50b as illustrated herein, so that the user may correctly place the object on the space of the pulse wave sensor 110, and may display a graphic object representing a change in reference force to be applied by the object to the pulse wave sensor 110 during a measurement time, for example, an upper limit 54a and a lower end 54b of the reference force.

Figure 5D:
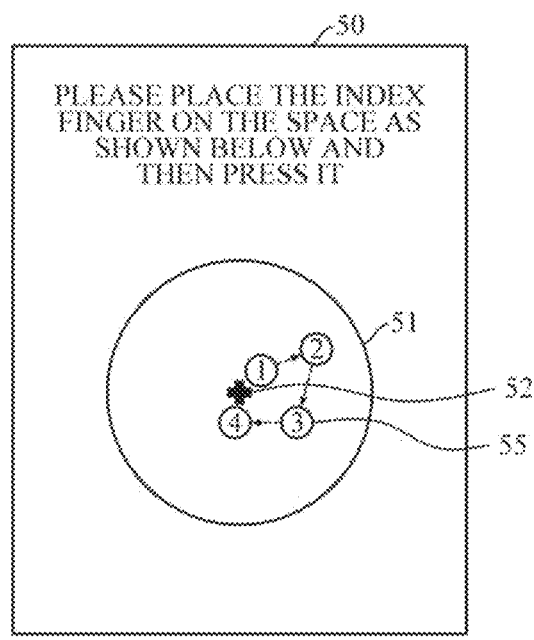

Referring to FIG. 5D, when the processor 130 generates an intensity map for each time point and detects the center of gravity while the pulse wave signal is measured, the output interface 210 in response may display the circular graphic object 51 and/or the marker 52, representing the center, on the display screen 50, and based on the detected center of gravity, the output interface 210 may output a graphic object 55 having a predetermined shape (for example, circle), which is superimposed on the graphic object 51 so that a position of force applied by the object may be highlighted.

In this case, based on the generated intensity map for each time point, the output interface 130 may vary, for example, the type and concentration of colors, the type and thickness of lines, and the like according to positions of the space/boundary of the first graphic object 51 and each time point. For example, as the intensity of a DC value of each channel increases, the output interface 210 may increase the concentration of a color at a corresponding position on the circular boundary of the first graphic object 51. In contrast, as the intensity of a DC value of each channel decreases, the output interface 210 may decrease the concentration of a color at a corresponding position. In addition, the output interface 210 may move the graphic object 55 for highlighting a position of the applied force, for example, in a first, second, third, and fourth directions continuously as illustrated herein, so that a change in the center of gravity over time may be visually displayed.

Figure 5E:
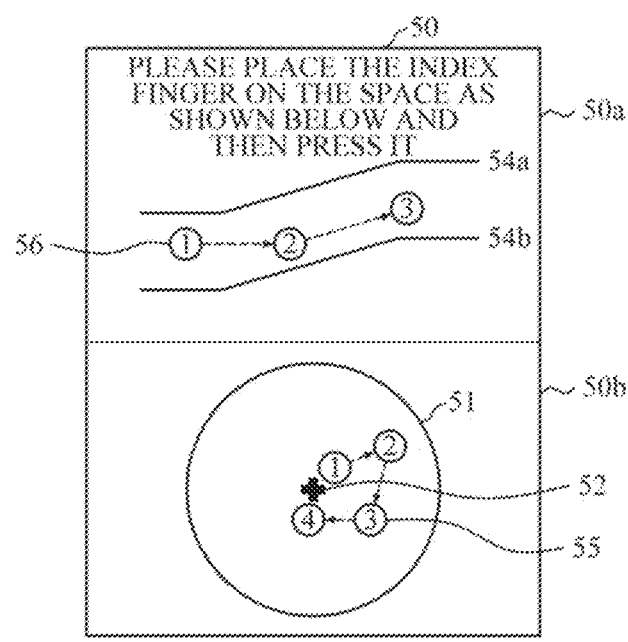

Referring to FIG. 5E, when the processor 130 generates the intensity map for each time point and detects the center of gravity while the pulse wave signal is measured, the output interface 210 may divide the display screen 50 into two areas 50a and 50b, and may output different types of information in the respective areas 50a and 50b.

For example, the output interface 210 may display, in an upper area 50a, a graphic object representing an upper limit 54a and a lower limit 54b of a reference force to be applied by the object to the pulse wave sensor 110 during the measurement time and a graphic object 56 representing the intensity of an actual force measured by the force sensor 120. In this case, a shape of the graphic object 56 is not specifically limited, and a position of the graphic object 56 may be moved continuously, for example, in the illustrated first, second, and third directions, so that a change in the actual force over time may be visually identified.

In addition, as described above with reference to FIG. 5D, the output interface 210 may display, in a lower area 50b, the circular graphic object 51 and/or the marker 52 representing the center, and based on the detected center of gravity, the output interface 210 may output the graphic object 55 which is superimposed on the graphic object 51 so as to highlight a position of the force applied by the object. In this manner, a user may more easily recognize whether the object is placed on a correct position of the pulse wave sensor during the entire measurement time, or whether the object applies a force vertically and uniformly to the center of the pulse wave sensor.

In addition, when the measurement of the pulse wave signal is complete, the output interface 210 may output the trajectory of the center of gravity or the change in separation distance between the center of gravity and the center on the display screen as illustrated in FIGS. 4D and 4E, or may output in real time the trajectory of the center of gravity or the change in separation distance up to a current time point during the measurement of the pulse wave signal. Further, the score for the trajectory of the center of gravity, which is calculated by the processor 130, and the like may be displayed on the display screen, and when the processor 130 determines to re-measure pulse wave signals, the output interface 210 may display information of FIGS. 5A to 5C and the like again on the screen so that the user may place the object on the pulse wave sensor 110 again.

Figure 6A:
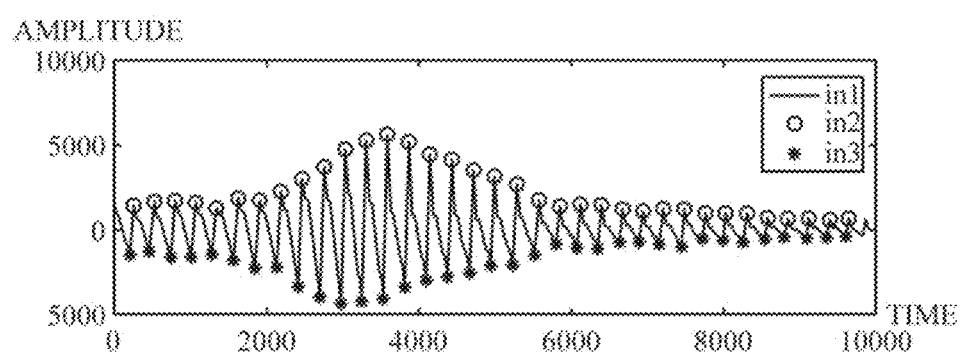
FIGS. 6A and 6B illustrate an example of estimating blood pressure based on oscillometry according to an example embodiment.
Figure 6B:
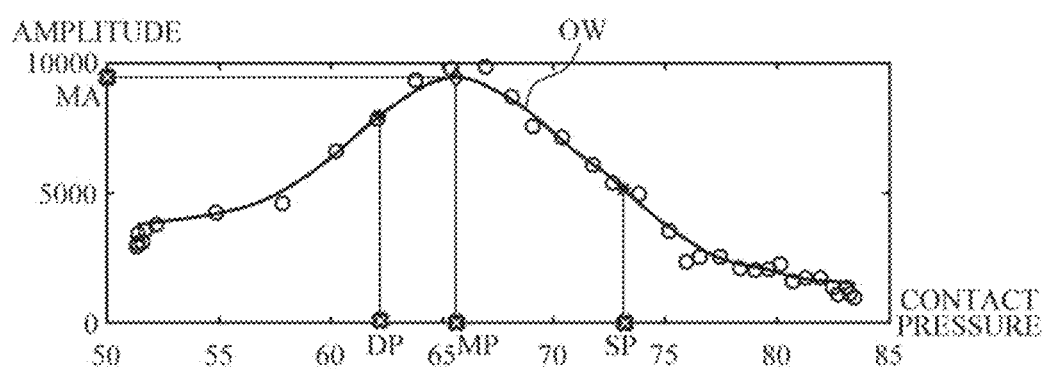

FIGS. 6A and 6B illustrate an example of estimating blood pressure based on oscillometry according to example embodiments.

FIG. 6A illustrates a change in amplitude of a pulse wave signal when an object, being in contact with the pulse wave sensor 110, gradually increases a pressing force. FIG. 6B illustrates an oscillometric waveform envelope OW which represents a relationship between a change in contact pressure and an amplitude of the pulse wave signal. In this case, the contact pressure may be a measured force value, which is measured by the force sensor 120, or a value obtained by converting the force value into a pressure value by using a pre-defined conversion equation. According to another example embodiment, in the case where a pressure sensor is mounted instead of the force sensor 120, the contact pressure may be a pressure value measured by the pressure sensor.

The processor 130 may select at least some of a plurality of channels, and may generate the oscillometric waveform envelope by using pulse wave signals of the selected channels. For example, the processor 130 may select channels in order of intensity of DC component values, in order closer to the center of gravity, and the like. In this case, if a plurality of channels are selected, the processor 130 may integrate pulse wave signals to generate a single pulse wave signal.

The processor 130 may extract, for example, a peak-to-peak point of the pulse wave signal waveform by subtracting a negative (−) amplitude value in3 from a positive (+) amplitude value in2 of a waveform envelope in1 at each measurement time point of the pulse wave signal. Further, the processor 130 may obtain an oscillometic waveform envelope (OW) by plotting the peak-to-peak amplitude at each measurement time point against a contact pressure value at a corresponding time point and by performing, for example, polynomial curve fitting.

The processor 130 may estimate, for example, blood pressure by using the generated oscillometic waveform envelope OW. The processor 130 may estimate mean arterial pressure (MAP) based on a contact pressure value MP at a maximum point MA of the pulse wave in the oscillometic waveform envelope OW. For example, the processor 130 may determine, as the MAP, the contact pressure value MP itself at the maximum point MA of the pulse wave, or may obtain the MAP from the contact pressure value MP by using a pre-defined MAP estimation equation. In this case, the MAP estimation equation may be expressed in the form of various linear or non-linear combination functions, such as addition, subtraction, division, multiplication, logarithmic value, regression equation, and the like, with no particular limitation.

Further, the processor 130 may estimate diastolic blood pressure and systolic blood pressure by using contact pressure values DP and SP, respectively, which are at the left and right points corresponding to amplitude values having a preset ratio, for example, 0.5 to 0.7, to an amplitude value at the maximum point MA of the pulse wave. The processor 130 may determine the contact pressure value DP as the diastolic blood pressure and the contact pressure value SP as the systolic blood pressure, or may estimate the diastolic blood pressure and systolic blood pressure from the respective contact pressure values DP and SP by using pre-defined diastolic blood pressure and systolic blood pressure estimation equations.

Figure 7:
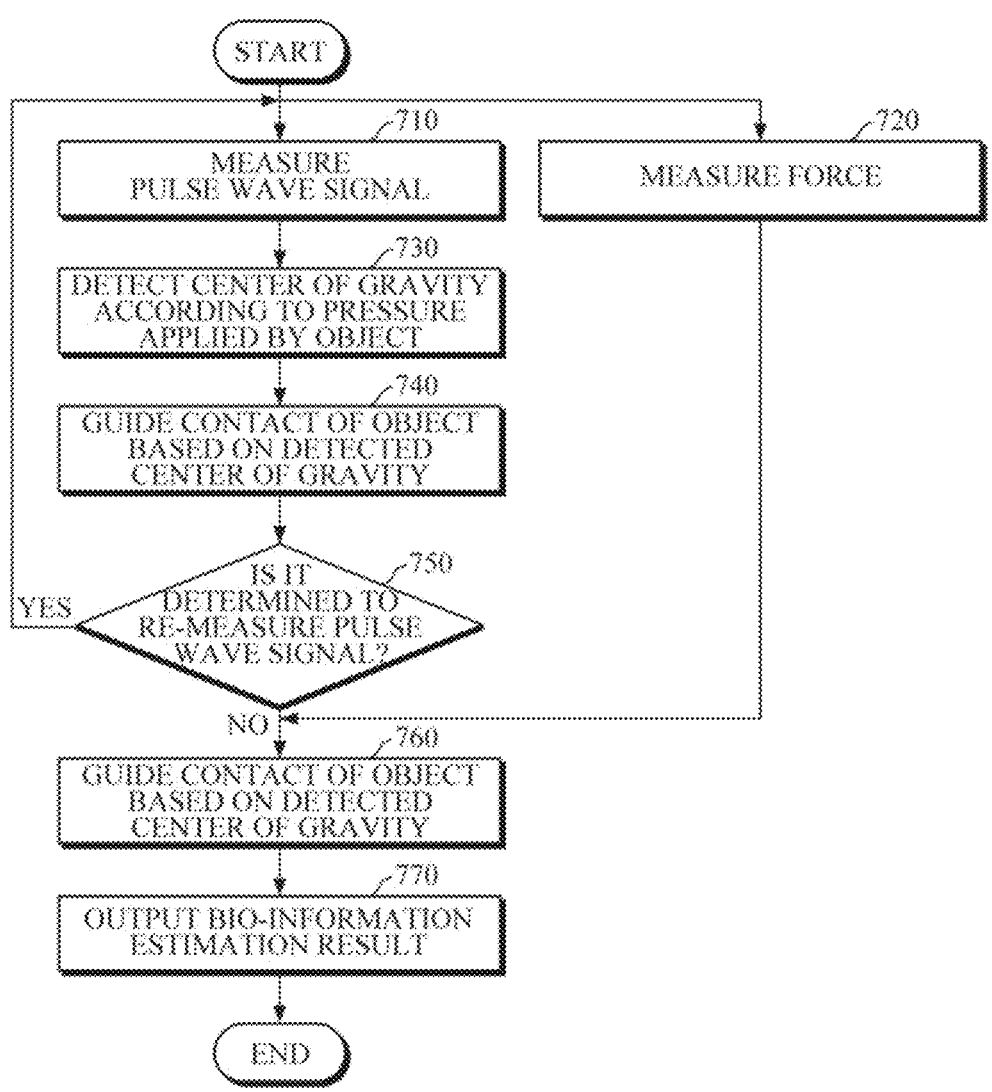
FIG. 7 is a flowchart illustrating a method of estimating bio-information according to an example embodiment.

FIG. 7 is a flowchart illustrating a method of estimating bio-information according to an example embodiment.

The method of FIG. 7 may be performed by the apparatuses 100 and 200 configured to estimate bio-information according to the embodiments of FIGS. 1 and 2, which are described above in detail, and thus will be briefly described below.

First, when an object comes into contact with the pulse wave sensor and changes a pressing force, the apparatus configured to estimate bio-information may measure pulse wave signals from the object by using the pulse wave sensor in operation 710. In this case, the pulse wave sensor may include a plurality of channels formed in an isotropic shape. In this case, upon receiving a request configured to estimate bio-information, the apparatus configured to estimate bio-information may output information for guiding a contact position or a contact force of the object, or the like on a display screen.

While the pulse wave sensor measures the pulse wave signals from the object, the apparatus configured to estimate bio-information may measure a force exerted between the object and the pulse wave sensor by using the force sensor in operation 720.

Then, based on the pulse wave signals acquired by the plurality of channels in operation 710, the apparatus configured to estimate bio-information may detect the center of gravity according to pressure applied by the object in operation 730. For example, the apparatus configured to estimate bio-information may extract DC components from the pulse wave signals of the respective channels, and may generate an intensity map at each time point by using the extracted DC component values at each time point. Further, the apparatus configured to estimate bio-information may detect the center of gravity at each time point by using the generated intensity map.

Subsequently, the apparatus configured to estimate bio-information may guide contact of the object based on the detected center of gravity in operation 740. For example, as described above with reference to FIGS. 5A to 5E, the apparatus configured to estimate bio-information may display a graphic object representing a circular space formed by the plurality of channels, and may display an object, which is superimposed thereon within the circular space, for highlighting a position of the force applied by the object.

Next, upon completing the measurement of the pulse wave signals according to the guide information, the apparatus configured to estimate bio-information may determine whether to re-measure pulse wave signals in operation 750. For example, as described above, the apparatus configured to estimate bio-information may determine whether to re-measure the pulse wave signals based on a separation distance between the detected center of gravity and the center of the pulse wave sensor. Upon determining that re-measurement is required, the apparatus configured to estimate bio-information proceeds to the operation 710 to re-measure the pulse wave signals.

Then, if the measurement of the pulse wave signals is complete such that re-measurement is not required, the apparatus configured to estimate bio-information may estimate bio-information based on the measured pulse wave signals and force in operation 760. For example, the apparatus configured to estimate bio-information may generate an oscillometric waveform envelope based on the pulse wave signals and force, and may estimate blood pressure by using the generated oscillometric waveform envelope.

Subsequently, the apparatus configured to estimate bio-information may output a bio-information estimation result in operation 770. The estimated bio-information value may be displayed visually through a display, and other related information may be output through a sound output module, a haptic module, and the like.

Figure 8:
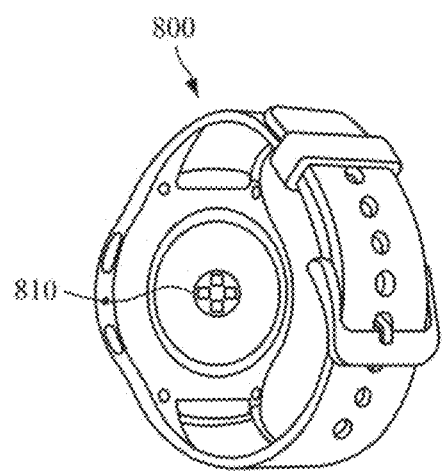
FIGS. 8, 9, 10 illustrating examples of an electronic device including an apparatus configured to estimate bio-information according to example embodiments.
Figure 9:
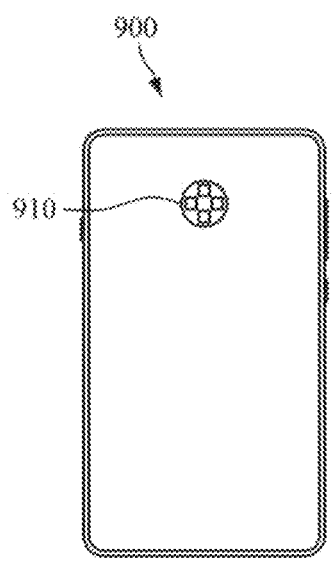
Figure 10:
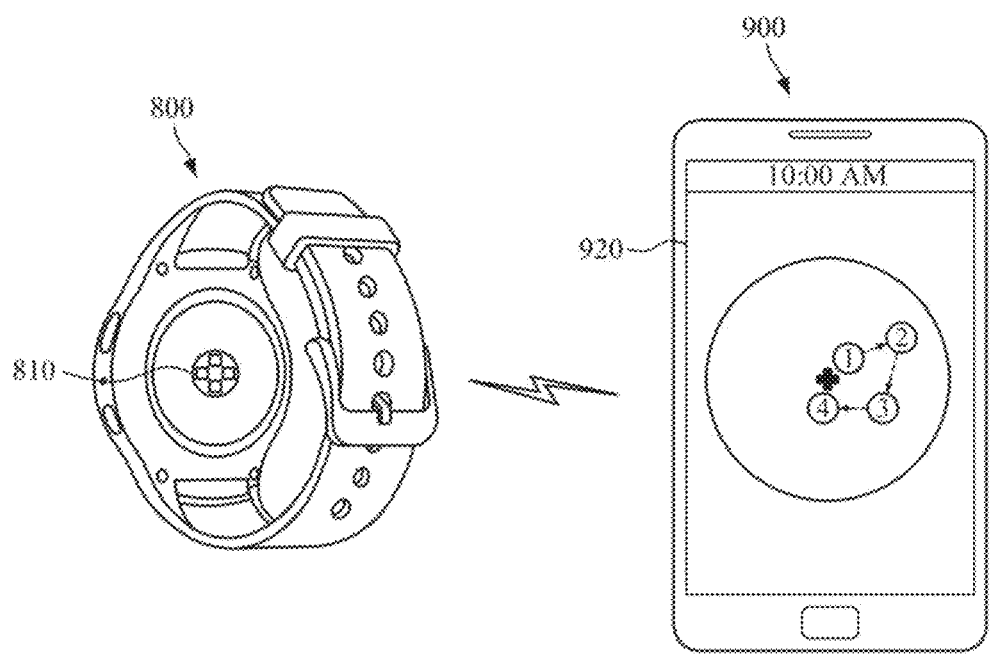

FIGS. 8 to 10 are diagrams illustrating an electronic device including example embodiments of an apparatus configured to estimate bio-information.

As illustrated in FIGS. 8 and 9, the electronic device may include a smart watch-type wearable device 800 and a mobile device 900 such as a smartphone. However, the wearable device is not limited thereto, and may include a smart band, smart glasses, a smart ring, a smart patch, a smart necklace, a tablet PC, and the like. The electronic device includes the apparatuses 100 and 200 configured to estimate bio-information, and all the components of the apparatuses 100 and 200 configured to estimate bio-information may be integrally mounted in a single device or may be distributed in two or more devices.

Referring to FIG. 8, the electronic device may be implemented as a wristwatch wearable device 800 and may include a main body and a wrist strap. A display is provided on a front surface of the main body, and may display general application screens, including time information, received message information, etc., and/or an application screen configured to estimate bio-information which displays guide information on contact of an object, a blood pressure estimation result, and the like. A sensor device 810 including the pulse wave sensor and the force sensor may be disposed on a rear surface of the main body to measure pulse wave signals and force/pressure configured to estimate bio-information. In addition, the main body may include a processor for guiding contact of an object or estimating blood pressure by using received data, an output interface for outputting data generated by the processor on the display, and a communication interface for transmitting and receiving information by communication with other electronic devices, and the like.

Referring to FIG. 9, the electronic device may be implemented as a mobile device 900 such as a smartphone.

The mobile device 900 may include a housing and a display panel. The housing may form an exterior of the mobile device 900. The housing has a first surface, on which a display panel and a cover glass may be disposed sequentially, and the display panel may be exposed to the outside through the cover glass. A sensor module 910, a camera module and/or an infrared sensor, and the like may be disposed on a second surface of the housing. When a user transmits a request configured to estimate bio-information by executing an application and the like installed in the mobile device 900, the mobile device 900 may measure a pulse wave signal and force from an object by using the sensor module 910. The main body may include a processor configured to guide contact of an object or estimate blood pressure by using received data, an output interface configured to output data generated by the processor on a display, and a communication interface configured to transmit and receive information by communication with other electronic devices, and the like.

FIG. 10 illustrates an example of estimating blood pressure by interconnection between the wristwatch wearable device 800 and the mobile device 900. As illustrated herein, when a user estimates blood pressure by using the wearable device 800, related information may be displayed on a display screen of the mobile device 900. In response to a user's request or when an object comes into contact with the sensor module 810, the wearable device 800 may detect a direction, in which the display is directed, by using various sensors, and when the detected direction is oriented toward a direction (for example, bottom direction) in which the user may not view the display, the wearable device 800 may be automatically interconnected with the mobile device 900. The wearable device 800 may transmit guide information on contact of the object, which is generated by the processor, to the mobile device 900 so that the information may be output on the screen of the display 920 of the mobile device, as illustrated herein.

The present disclosure can be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (for example, data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be readily deduced by programmers of ordinary skill in the art to which the invention pertains.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An apparatus configured to estimate bio-information, the apparatus comprising:
   a pulse wave sensor comprising a plurality of channels disposed in an isotropic shape;
   a force sensor configured to measure a force applied by an object to the pulse wave sensor;
   a processor configured to:
      detect a center of gravity based on pressure, applied by the object, in a space formed by the plurality of channels based on pulse wave signals measured by each of the plurality of channels included in the pulse wave sensor;
      provide a user with guide information with respect to contact of the object to the pulse wave sensor based on the detected center of gravity; and
      estimate the bio-information based on the pulse wave signals and the force which are measured based on the guide information; and
   an output interface configured to display a graphic object having a predetermined shape and a marker corresponding to a center of the graphic object on a screen to guide the user to place the object on the space,
   wherein based on the detected center of gravity, the output interface is further configured to:
      highlight a position of the force, applied by the object, on the graphic object; and
      move the highlighted position based on a change in the detected center of gravity, and
   wherein the output interface is further configured to:
      display a trajectory of the center of gravity during an entire measurement time by superimposing the trajectory of the center of gravity on the graphic object, and
      display a graph showing a change in separation distance between a center of the space and the center of gravity.

2. The apparatus of claim 1, wherein each of the plurality of channels included in the pulse wave sensor comprises at least one of a light source configured to emit light onto the object, and a detector configured to detect light scattered or reflected from the object.

3. The apparatus of claim 1, wherein the processor is further configured to:
   extract direct current (DC) values from the pulse wave signals measured by each of the plurality of channels;
   generate an intensity map by mapping the extracted DC values of each of the plurality of channels to a circular boundary; and
   detect the center of gravity based on the generated intensity map.

4. The apparatus of claim 3, wherein based on the DC values of each of the plurality of channels, the processor is further configured to:
   obtain DC values for a plurality of virtual channels to be disposed on the circular boundary; and
   generate the intensity map by mapping the DC values of each of the plurality of channels and the DC values of the plurality of virtual channels to the circular boundary.

5. The apparatus of claim 1, wherein the processor is further configured to calculate a score with respect to the trajectory of the center of gravity based on the separation distance, and
   wherein the output interface is further configured to display the calculated score on the screen.

6. The apparatus of claim 1, wherein the output interface is further configured to display at least one of a graphic object configured to guide a change in reference force to be applied by the object to the pulse wave sensor during measurement of the pulse wave signals, and a graphic object representing a change in actual force measured by the force sensor.

7. The apparatus of claim 1, wherein the processor is further configured to determine whether to re-measure the pulse wave signals based on the separation distance between the center of gravity at each time point and the center of the space.

8. The apparatus of claim 1, wherein, based on at least one of a number of times the separation distance deviates from a reference value being greater than or equal to a threshold number of times, a period of time when the separation distance continuously deviates from the reference value being greater than or equal to a threshold period of time, and a score for the trajectory of the center of gravity being lower than or equal to a threshold value, the processor is further configured to determine whether to re-measure the pulse wave signals.

9. The apparatus of claim 1, wherein the processor is further configured to:
   generate an oscillometric waveform envelope based on the pulse wave signals and the force; and
   estimate the bio-information based on the generated oscillometric waveform envelope.

10. The apparatus of claim 1, wherein the bio-information comprises one or more of blood pressure, vascular age, arterial stiffness, aortic pressure waveform, vascular compliance, stress index, and fatigue level.

11. An electronic device comprising:
- a main body;
- a pulse wave sensor comprising a plurality of channels disposed in an isotropic shape on a surface of the main body which comes into contact with an object;
- a force sensor disposed on an upper end or a lower end of the pulse wave sensor and configured to measure a force applied by the object to the pulse wave sensor;
- a processor configured to:
    - detect a center of gravity based on pressure, applied by the object, in a space formed by the plurality of channels based on pulse wave signals measured by each of the plurality of channels included in the pulse wave sensor;
    - provide a user with guide information with respect to contact of the object to the pulse wave sensor based on the detected center of gravity; and
    - estimate blood pressure based on the pulse wave signals and the force which are measured based on the guide information; and
- an output interface configured to display a graphic object having a predetermined shape and a marker corresponding to a center of the graphic object on a screen to guide the user to place the object on the space,
- wherein based on the detected center of gravity, the output interface is further configured to:
    - highlight a position of the force, applied by the object, on the graphic object; and
    - move the highlighted position based on a change in the detected center of gravity, and
- wherein the output interface is further configured to:
    - display a trajectory of the center of gravity during an entire measurement time by superimposing the trajectory of the center of gravity on the graphic object, and
    - display a graph showing a change in separation distance between a center of the space and the center of gravity.

12. An apparatus configured to estimate bio-information, the apparatus comprising:
- a pulse wave sensor comprising a plurality of channels disposed in an isotropic shape;
- a force sensor configured to measure a force applied by an object to the pulse wave sensor;
- a processor configured to:
    - detect a center of gravity based on pressure, applied by the object, in a space formed by the plurality of channels based on direct current (DC) values extracted from pulse wave signals measured by each of the plurality of channels included in the pulse wave sensor;
    - provide a user with guide information with respect to contact of the object to the pulse wave sensor based on the detected center of gravity being spaced apart from a center of the space; and
    - estimate the bio-information based on the pulse wave signals and the force which are measured based on the guide information; and
- an output interface configured to display a graphic object having a predetermined shape and a marker corresponding to a center of the graphic object on a screen to guide the user to place the object on the space,
- wherein based on the detected center of gravity, the output interface is further configured to:
    - highlight a position of the force, applied by the object, on the graphic object; and
    - move the highlighted position based on a change in the detected center of gravity, and
- wherein the output interface is further configured to:
    - display a trajectory of the center of gravity during an entire measurement time by superimposing the trajectory of the center of gravity on the graphic object, and
    - display a graph showing a change in separation distance between the center of the space and the center of gravity.

* * * * *